July 11, 1961 J. FRASER ET AL 2,991,795
SELF CLOSING MEASURING VALVE
Filed Sept. 16, 1957 4 Sheets-Sheet 2
FIG. 4.
FIG. 6.
FIG. 5.
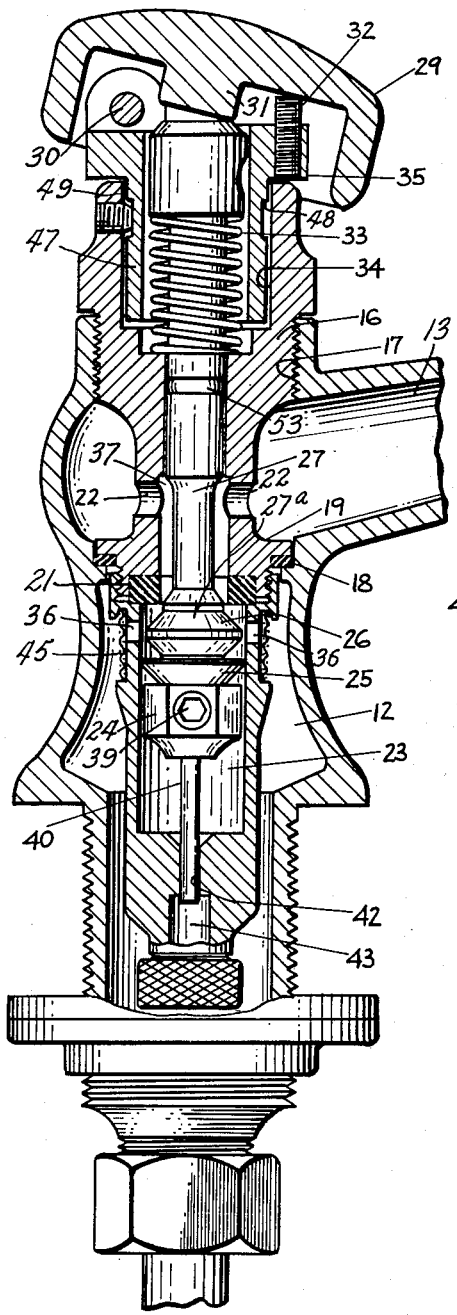
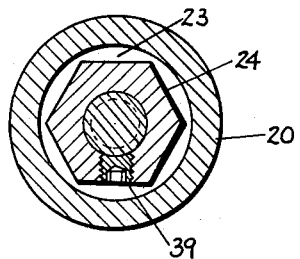
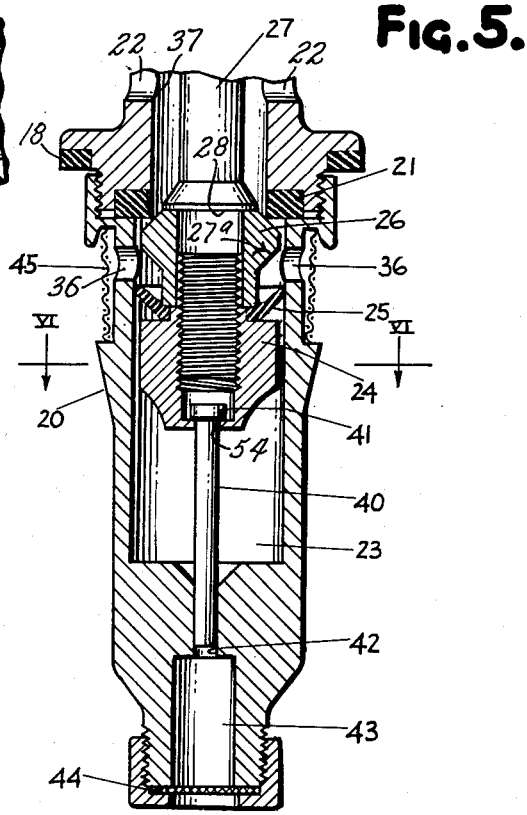
INVENTORS
JAMES FRASER
& EDWARD S McLEAN
BY Holcombe Wetherill & Brisebois
ATTORNEYS July 11, 1961  J. FRASER ET AL  2,991,795
SELF CLOSING MEASURING VALVE
Filed Sept. 16, 1957  4 Sheets-Sheet 3

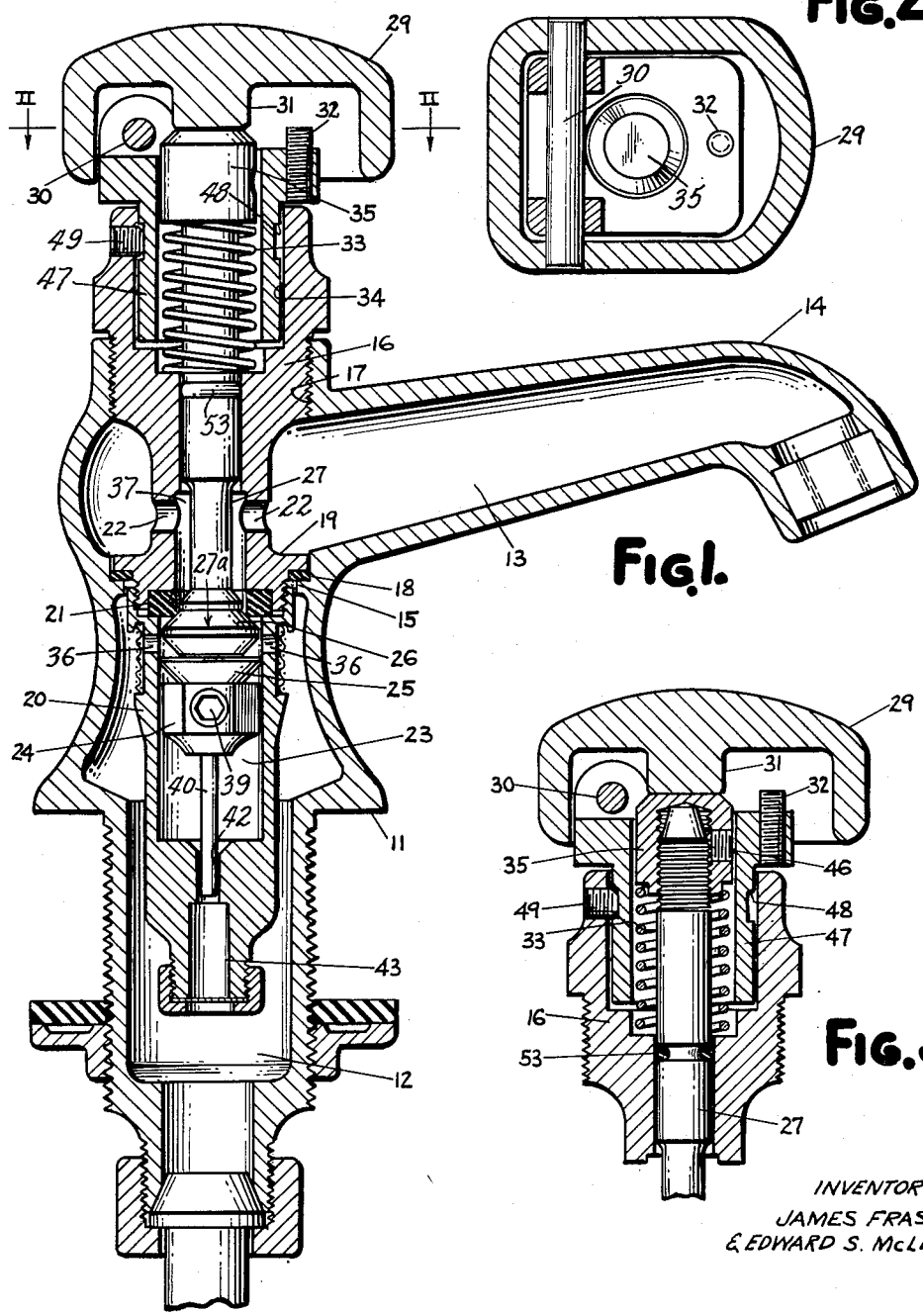

INVENTORS
JAMES FRASER
& EDWARD S. McLEAN
BY Holcombe Wetherill & Brisebois
ATTORNEYS INVENTORS
JAMES FRASER
& EDWARD S. McLEAN
BY Holcombe Wetherill & Brisebois
ATTORNEYS

United States Patent Office 2,991,795
Patented July 11, 1961

2,991,795
SELF CLOSING MEASURING VALVE
James Fraser and Edward S. McLean, Wilmington, Del.,
assignors to Speakman Company, Wilmington, Del.
Filed Sept. 16, 1957, Ser. No. 684,024
1 Claim. (Cl. 137—244)

The present invention relates to a metering valve for schools, institutions, public washrooms and the like.

The general object of the present invention is to provide an improved self-closing measuring valve structure primarily devised and adapted for use as a water supply valve and including means readily adjustable to vary the amount of water discharged by the valve on each normal actuation thereof. This improved valve structure is generally similar in type and form to the self-closing measuring valve disclosed and claimed in the prior Patent No. 2,181,581, granted November 28, 1939, on the application of James Fraser, one of the applicants herein. Extensive commercial use has been made of the valve structure disclosed and claimed in said prior Fraser patent.

Specific objects of the present invention are to simplify and improve the structure and operation of the measuring valve disclosed in said Fraser patent, and to reduce the inherent cost of construction and maintenance of such a valve.

It is also an object of the present invention to provide an actuating means for this valve structure which may be operated with a minimum amount of force, thereby lending the valve to operation by small children of kindergarten age.

It is still a further object of this invention to provide a valve operating means that is self-enclosed and not subject to vandalism.

The various features of novelty which characterize this invention are pointed out with particularity in the claim annexed to and forming part of this specification.

For a better understanding of the invention, however, its advantages, and specific objects obtained by its use, reference should be had to the accompanying drawings and descriptive matter in which have been illustrated and described the preferred embodiment of the invention.

Of the drawings:

FIGURE 1 is a longitudinal sectional view of a lavatory faucet.

FIG. 2 is a section on line II—II of FIGURE 1.

FIG. 3 is a longitudinal view in section of the operating mechanism of the valve shown in FIG. 1.

FIG. 4 is a longitudinal sectional view of the valve shown in FIG. 1 in the open position.

FIG. 5 is an enlarged detailed view of the lower part of FIG. 4.

FIG. 6 is a sectional view on line VI—VI of FIG. 5.

Figure 7:
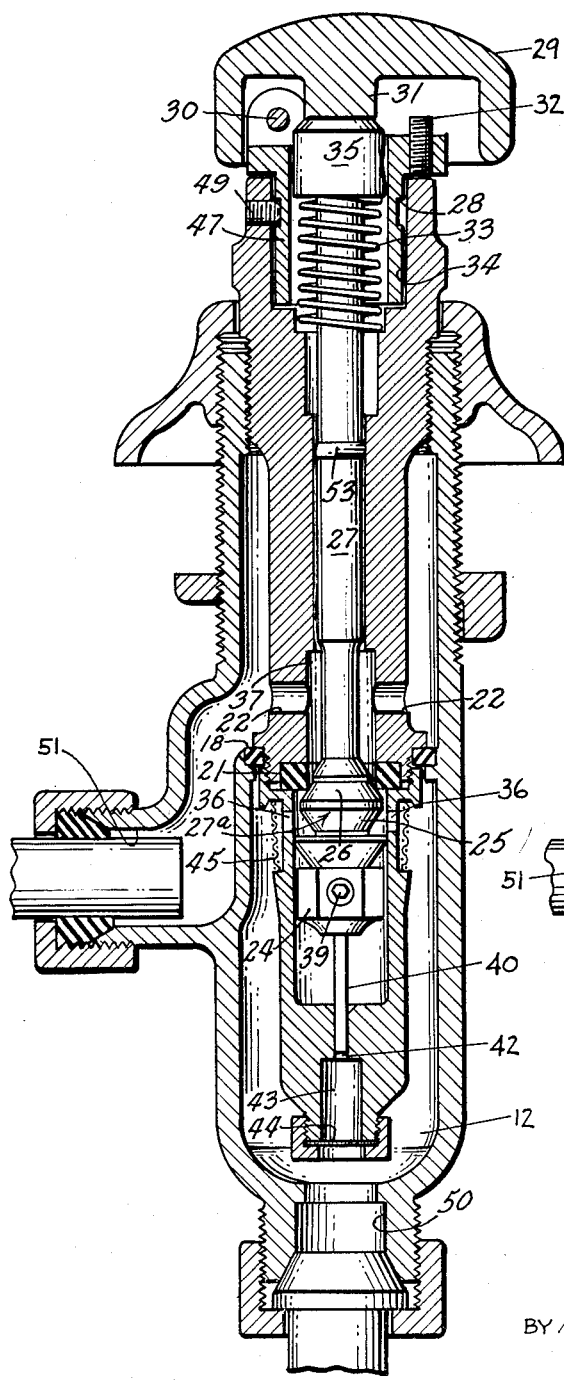
FIG. 7 is a longitudinal sectional view of a lavatory valve.

In the drawings, in FIGURES 1, 2, 3, 4 and 5, have been illustrated the use of this invention in an ordinary basin supply faucet comprising a casing element 11 having a lower inlet chamber 12 and an upper outlet chamber 13 and a lateral discharge spout 14, leading away from the chamber 13. The casing element 11 is formed with an internal annular shoulder 15 between its inlet and outlet chambers 12 and 13. A tubular valve guide and seat member 16 extend into the outlet chamber 13 through an internally threaded opening 17 in the top wall of the casing element 11, and is in threaded engagement therewith. As shown, a gasket or washer 18 is clamped between the annular shoulder 15 of the casing 11 and the overlapping flange 19 at the lower end of the guide member 16. A tubular member 20 having its upper end in threaded engagement with the lower end of the guide member 16 extends downwardly into the lower portion of the inlet chamber 12. The adjacent ends of the members 16 and 20 are recessed to form an annular groove in which is clamped a peripheral portion of an annular valve seat washer member 21 surrounding a valve port 22. A valve member is represented in general by the numeral 27a. The tubular member 20 is formed with a piston chamber 23 receiving an axially movable cup washer 25 and valve head 26. The latter is slipped on the lower end of a valve stem 27 which has a flange 28 against which the cup washer 25 and valve head 26 are held firmly in place by threaded nut 24. The valve stem 27 extends axially through the guide member 16 and has its upper end adjustably connected to an operating mechanism 29 comprising a push button pivoted at 30 at the side remote from the discharge spout and having a boss 31 on its under side. This boss is in sliding contact with the upper end of the valve stem 27. The line of contact between the boss 31 and the valve stem 27 is approximately in line with the pivot 30 so that on operation of the operating mechanism 29 there is a minimum of sliding friction between the boss and the valve stem. The movement of this mechanism is limited by the set screw 32 retained within the top wall of the housing 47 as shown in FIGS. 1 and 3. A helical compression spring 33 received in an enlarged upper portion of the bore of the chamber 34, acts between the member 16 and the cap 35 to bias the valve stem for axial movement into the position in which the valve member 27a engages the valve seat member 21. When the operating mechanism 29 is depressed as shown in FIG. 4, the valve head 26 is moved downwardly out of engagement with the valve seat 21. This permits water to pass from the inlet chamber 12 through the lateral inlet ports 36, shown in FIG. 5, into the upper end of the piston chamber 23 and hence through the valve port 22 into the chamber 37 formed by an enlarged portion of the bore of the guide member 16. Lateral ports 22 in the wall of the chamber 37 permit the water to pass from chamber 37 into the faucet outlet chamber 13.

The head 26, shown in FIG. 5 has its upper surface in conical form and contacts the washer member 21. The washer member 21, described above, is square in cross section. This arrangement of a conical valve head 26 and annular washer member allows for wear and distortion of the washer member 21 without affecting the function of the valve and does not require the close adjustment of the usual valve resting on a yieldable seat. The cup washer 25 is formed of an artificial or synthetic rubber-like material known as neoprene (or like material) and is not made of leather. The cup washer 25 held between the valve head 26 and the nut 24 are attached to the valve stem 27 by means of the threaded portion shown in FIG. 5 and rigidly held in position by means of the set screw 39 shown in FIG. 6. This nut 24 is hexagonal in cross section and fits within the chamber 23 in such a manner that the nut 24 is in sliding contact with the walls of the chamber 23. This acts as a lower guide for the valve stem and retains these parts in axial alignment. The set screw 39 is placed in the face of the hexagonal side in such a manner that it does not protrude beyond the face of the side and retains the nut 24 in position.

The metering pin 40 is held in floating suspension from the nut 24 by means of an opening 54 in the bottom of this nut 24 which is slightly larger than the pin 40 and a head 41 on the upper end of the pin is larger than the opening 54 so as to retain it within the nut 24. This results in this pin having some lateral movement within the nut 24 and it serves two functions. It controls the refill of the portion of the piston chamber 23 below the cup washer 25 and also serves the purpose of cleaning the deposit of dirt and other foreign matter from the walls of the opening in the lower part of the chamber in which it rides. The pin 40 is received within the opening 42 in the lower part of the tubular member 20 and restricts the flow of water into the piston chamber 23 from the outer chamber 43 and thereby regulates the rate at which the water may enter the piston chamber 23 and determine the rate at which the valve stem 27 rises under the force of the helical spring 33. This pin, as pointed out above, is held in floating engagement with the valve stem and is free to move a limited amount in a lateral direction. This insures the proper alignment of the pin 40 with the opening 42 and prevents undue wear on the side walls of the opening 42, which wear is a defect in the metering valve disclosed in the above mentioned patent.

The flow of water from the inlet chamber 12 into the outer chamber 43 passes through screen 44 which will remove suspended matter therefrom and protects the pin 40 from becoming clogged in the opening 42. The force used to close the valve is obtained from the spring 33 and if the valve does not close the operator is unable to increase this force without dismantling the valve. Therefore, it is essential that the conical valve face on the upper surface of the valve head 26 and the surface of the washer member 21 be protected from foreign matter lodging therebetween. This is accomplished by placing a screen 45 over the ports 36 so as to prevent suspended matter from being carried with the water into the valve member.

The operating mechanism 29 shown in FIGS. 1 and 2 is shown in greater detail in FIG. 3. The cap 35 retains the helical spring 33 thereunder. This cap is in threaded engagement with the upper end of the valve stem 27 and is retained in position by means of a set screw 46 in the side thereof.

The housing 47 has a groove 48 in the side thereof and is held in position by means of the set screw 49. This housing carries the set screw 32, which limits the movement of the operating mechanism, and also has attached thereto the pivot 30. The valve stem 27 is retained in water-tight engagement with the guide 16 by means of the O-ring 53. This allows easy movement of the valve stem within the guide and avoids excessive friction heretofore experienced with packing glands.

Figure 8:
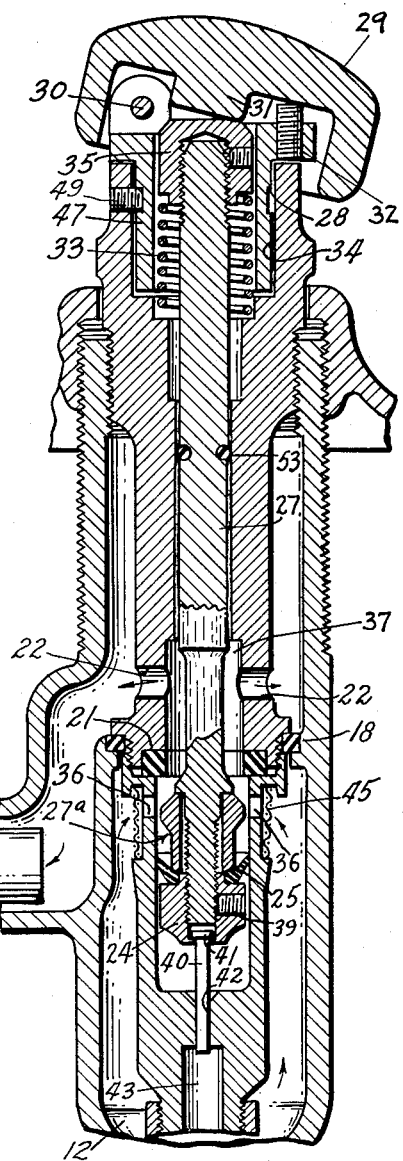
FIG. 8 is a view similar to FIG. 7 showing the valve in the open position.

While in the above description of this invention, the valve has been applied to a faucet such as is used in a basin or sink, this type of structure may be used in conjunction with a lavatory where a needed amount of water is desired. Such an application of this valve is shown in FIGS. 7 and 8. The water inlet 50 is attached to the bottom of the inlet chamber 12. The water flows through this chamber, through the screened ports 36, and when the valve is in the open position, as shown in FIG. 8, the water flows through these ports through the chamber 37, out the ports 22 and out the outlet 51. This valve mechanism is operated by operating mechanism 29 similar to that described above and shown in FIGS. 1, 3 and 4. The quantity of water may be regulated by the clearance between the pin 40 and the opening 42. It may also be adjustably controlled by the regulation of the set screw 32 so as to meter in the amount of water desired. This of course will depend to some extent on the water supply pressure.

Figure 9:
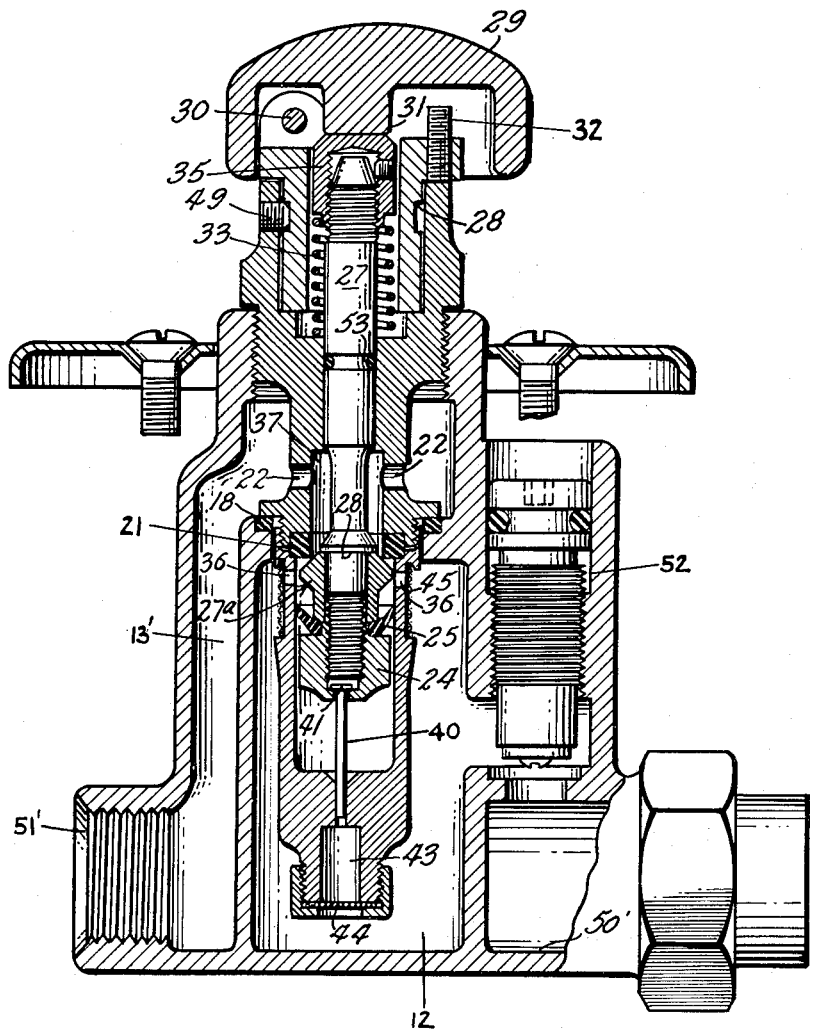
FIG. 9 is a longitudinal sectional view of a shower valve.

This same valve may be applied to a shower, wherein the water inlet 50' admits the water into the inlet chamber 12 through the adjustable pressure regulator 52 as shown in FIG. 9. The water is then metered by means of this valve through the outlet 51', passes successively through the screened ports 36 and between the valve seat 21 and the valve head 26, through the upper chamber and the port 22 and into the outlet chamber 13'. The amount of water may be regulated by the space around the pin 40 and the set screw 32.

Valves of the type described above have found increasing advantages in all sections of the country due to the decrease in the water supply, and it is very desirable to have metering valves in all bathroom fixtures, particularly shower baths where the water is usually wasted.

For convenience of description the valve structure shown herein has been described in an upright position, but those skilled in the art will recognize this valve is adapted for use with its axis horizontal or inclined to the vertical as well as in the upright position shown.

While in accordance with the provisions of the statutes, the best embodiment of this invention has been illustrated and described, it will be apparent to those skilled in the art that changes may be made in the form of the apparatus disclosed without departing from the spirit of this invention as set forth in the appended claim, and that in some cases certain features may be used to advantage without a corresponding use of other features.

What is claimed is:

A self-closing measuring valve mechanism unit mounted in a casing of a valve structure to control the communication between inlet and outlet chambers of said casing, and comprising an elongated stationary member formed with an axial passage having different longitudinal portions of different diameters; a lower inlet chamber having a screen over the lower inlet end thereof, a timing chamber above said inlet chamber and connected therewith by a restricted passage, inlet ports above the said timing chamber having a screen thereover, a valve seat above the inlet ports, exhaust ports above the valve seat, and a guide chamber in the upper end thereof; a valve stem arranged within the said stationary member having a pin floatingly mounted on the lower end thereof within said restricted passage, a nut in sliding engagement with the walls of the timing chamber holding said pin on the lower end of said valve stem, a cup washer on said stem above said nut in contact with the walls of said timing chamber, a valve head comprising a portion in the form of a truncated cone on said stem adjacent said washer with a smaller portion extending into the path surrounded by said valve seat and contacting said valve seat when the valve is in a closed position and thereby preventing flow of water between the inlet ports and the outlet ports in said stationary member; said valve stem extending above the valve head and retained in sliding engagement with the wall of said guide chamber and maintained in a closed position by a biasing means above said guide chamber and having an enlarged portion on the upper part of said valve stem, a cap pivoted at one side on the upper end of said valve casing and having a boss on the under side of said cap in line with and in contact with the enlarged upper portion of said valve stem, the plane of contact between said boss and said upper part of said valve stem being in line with said pivot, an adjustable stop means mounted in the upper part of said casing on the side opposite from said pivot for engagement by said cap, said cap having an elongated operating portion on the side opposite from said pivot.

References Cited in the file of this patent

UNITED STATES PATENTS

| | | |
|---|---|---|
| 1,018,463 | Watrous | Feb. 27, 1912 |
| 2,154,811 | Goss | Apr. 18, 1939 |
| 2,181,581 | Fraser | Nov. 28, 1939 |
| 2,212,308 | Steen | Aug. 20, 1940 |
| 2,469,946 | Bremer | May 10, 1949 |
| 2,675,206 | Lindberg | Apr. 13, 1954 |
| 2,743,079 | Sills | Apr. 24, 1956 |

FOREIGN PATENTS

| | | |
|---|---|---|
| 11,239 | Great Britain | May 14, 1906 |
| 455,059 | France | May 14, 1913 |